(12) United States Patent
Hanebrink (10) Patent No.: US 7,193,528 B2
(45) Date of Patent: Mar. 20, 2007

(54) METHOD FOR OUTPUTTING TRAFFIC INFORMATION IN A MOTOR VEHICLE

(75) Inventor: Thomas Hanebrink, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/999,687

(22) Filed: Nov. 30, 2004

(65) Prior Publication Data

US 2005/0162284 A1 Jul. 28, 2005

Related U.S. Application Data

(62) Division of application No. 09/515,813, filed on Feb. 29, 2000, now Pat. No. 6,868,331.

(51) Int. Cl.
*G08G 1/095* (2006.01)
(52) U.S. Cl. .............. 340/907; 340/988; 701/117; 701/209; 701/210; 701/211
(58) Field of Classification Search ........... 340/907, 340/988; 701/117, 209, 210, 211
See application file for complete search history.

(56) References Cited

U.S. PATENT DOCUMENTS

| | | | |
|---|---|---|---|
| 5,095,532 A | 3/1992 | Mardus | 455/186 |
| 5,164,904 A | 11/1992 | Sumner | 364/436 |
| 5,173,691 A | 12/1992 | Sumner | 340/905 |
| 5,193,214 A | 3/1993 | Mardus et al. | 455/54.2 |

(Continued)

FOREIGN PATENT DOCUMENTS

DE 68906966 T2 1/1994

(Continued)

*Primary Examiner*—Julie Bichngoc Lieu
(74) *Attorney, Agent, or Firm*—Perman & Green, LLP (57) ABSTRACT

Traffic messages are received together with the respective position of the point relating to the message. Only those traffic messages that relate to a selected area together with the respective position of a point related to the traffic message are stored. The positions of the traffic messages are compared with a respective position of the motor vehicle in order to determine distances between the respective positions in the traffic messages and the position of the motor vehicle. The traffic messages are sorted in accordance with distances determined and the traffic messages starting with the smallest distance are outputted. Whether the traffic message is significant for a current direction of travel or for an opposite direction of travel is detected, and only traffic messages that are relevant to the current direction of travel are outputted.

14 Claims, 4 Drawing Sheets

U.S. PATENT DOCUMENTS

| | | | |
|---|---|---|---|
| 5,289,184 A | 2/1994 | Suzuki | 340/905 |
| 5,406,490 A | 4/1995 | Braegas | 364/449 |
| 5,459,665 A | 10/1995 | Hikita et al. | 364/437 |
| 5,635,924 A | 6/1997 | Tran et al. | 340/905 |
| 5,739,773 A | 4/1998 | Morimoto et al. | 340/990 |
| 5,831,552 A | 11/1998 | Sogawa et al. | 340/995 |
| 5,835,026 A | 11/1998 | Wicks et al. | 340/905 |
| 5,850,190 A | 12/1998 | Wicks et al. | 340/905 |
| 5,862,510 A | 1/1999 | Saga et al. | 701/211 |
| 5,892,463 A | 4/1999 | Hikita et al. | 340/995 |
| 5,908,464 A | 6/1999 | Kishigami et al. | 701/208 |
| 5,911,773 A | 6/1999 | Mutsuga et al. | 701/200 |
| 5,933,094 A | 8/1999 | Goss et al. | 340/905 |
| 6,012,012 A | 1/2000 | Fleck et al. | 701/117 |
| 6,111,521 A | 8/2000 | Mulder et al. | 340/905 |
| 6,151,552 A | 11/2000 | Koizumi et al. | 701/211 |
| 6,163,751 A | 12/2000 | Van Roekel | 701/210 |
| 6,185,503 B1 | 2/2001 | Sumizawa | 701/209 |
| 6,255,963 B1 | 7/2001 | Heimann et al. | 340/905 |
| 6,266,607 B1 | 7/2001 | Meis et al. | 701/117 |
| 6,285,279 B1 | 9/2001 | Yamazaki | 340/432 |

FOREIGN PATENT DOCUMENTS

| | | |
|---|---|---|
| DE | 19638515 A1 | 4/1998 |
| DE | 19730452 A1 | 1/1999 |
| EP | 0347354 A1 | 12/1989 |
| EP | 0829837 A1 | 3/1998 |
| EP | 0892514 A2 | 1/1999 |
| JP | 06168396 A | 6/1994 |
| JP | 09145390 A | 6/1997 |

METHOD FOR OUTPUTTING TRAFFIC INFORMATION IN A MOTOR VEHICLE

CROSS-REFERENCE TO RELATED APPLICATIONS

This application is a divisional of and claims priority to U.S. application Ser. No. 09/515,813, filed on Feb. 29, 2000 now U.S. Pat. No. 6,868,331.

BACKGROUND OF THE INVENTION

1. Field of Invention

The invention relates to a method for outputting traffic information in a motor vehicle.

2. Brief Description of Related Developments

It has already been known for some time to output traffic messages via radio transmitters so that the drivers of motor vehicles can listen to these traffic messages using a radio receiver in the vehicle. The individual radio transmitters supply essentially only traffic messages which relate to the relevant transmission area. Furthermore, the traffic messages are usually sorted in such a way that they are output according to the importance of the respective roads in question. Traffic messages relating to motorways are therefore usually broadcast before such messages relating to trunk roads and towns.

If, as is the case in conurbation areas, there are very large numbers of messages, the driver of a vehicle has to pay careful attention to the traffic messages as they are received, in order to determine whether there are traffic messages which are relevant to him. This can be extremely disruptive and distract the driver from the current events on the road. On the other hand, it is frequently the case here that the driver pays careful attention to the individual traffic messages, but at the decisive moment is disrupted by the current events on the road which, for reasons of safety, have priority for the driver's attention, with the result that he in fact fails to hear the traffic message which is of interest to him.

In addition to this traffic information system which uses public and private radio transmitters, further traffic information systems which permit a user, that is to say for example a driver of a motor vehicle, to request traffic information on a specific basis are already known.

In such a known traffic information system, the driver of a motor vehicle can communicate the geographic area for which he wishes to have traffic information to a terminal installed in the motor vehicle, before he begins a journey. To do this he has to enter appropriate information into the terminal, for instance the fact that the driver in future wishes to move within a town or intends, for example, to aim for a more distant destination on an overland route or a motorway. In the former case, only traffic information which relates to a circular region with a predetermined radius around the motor vehicle is displayed or communicated to the driver. The driver can also determine the magnitude of the radius. In contrast, in the latter case, the driver is only provided with traffic information which applies to a predefined region around the motor vehicle and to that region in which the motor vehicle is moving in the direction of the destination. In the second case, the region for which relevant traffic information is obtained is, as it were, in the form of a keyhole. Here too, radii and distances can be freely selected by the driver before he begins his journey, or can be predefined by the system.

Although in this traffic information system the number of traffic messages is reduced by the specific geographic limitation of the region for which traffic messages are output, the user who is interested in traffic information has to listen to all the traffic messages in order to determine whether there are traffic messages which are relevant to him.

On this basis, the invention is based on the object of making available a method for outputting traffic information in a motor vehicle, which makes it possible to output the traffic messages on a specific basis in such a way that the interested user is informed as quickly as possible of the traffic situation which is important for him.

This object is achieved by means of the method according to claim 1. Advantageous refinements of the invention are described in the subclaims.

SUMMARY OF THE INVENTION

According to the invention, traffic information is therefore stored together with the respective position of the route section or point to which it relates. Before the traffic information is output, the positions of the traffic messages are then compared with the respective position of the motor vehicle in which the traffic messages are to be output, in order to determine the distances between the respective positions in the traffic messages and the position of this motor vehicle. The traffic messages are subsequently sorted according to distances and output starting with the smallest distance. The first traffic message which is announced or displayed to the driver using the method according to the invention is therefore the traffic message which is closest to the current position of the motor vehicle. Depending on the type of traffic message, the driver can thus decide immediately to what extent the announced traffic situation or the announced route status directly influences his route planning, so that, if appropriate, he can still in good time select an alternative route instead of the planned route.

According to a first exemplary embodiment of the invention, there is provision for the sorted traffic messages to be transmitted to a motor vehicle. Here, the traffic messages are therefore already sorted by the service provider, that is to say the operator of the traffic information system, so that the terminal in the motor vehicle for outputting the traffic information can be of extremely simple design.

However, in another advantageous development of the invention, there is provision for the traffic messages to be transmitted to a motor vehicle, sorted there and stored, the traffic messages which are transmitted to a motor vehicle being continuously updated at predefinable time intervals.

This permits the driver of a motor vehicle to have up-to-date traffic information announced or displayed to him at any time, this traffic information being output as a function of the current location.

In an advantageous development of the invention there is provision for only traffic messages which relate to a selected area to be stored and are subsequently output in the motor vehicle. This allows the number of traffic messages to be stored to be significantly reduced, with the result that, on the one hand, the memory requirements in the terminal are kept relatively small and, on the other hand, the sorting time before outputting can be reduced.

Although it is possible for the selection of the traffic information which is to be transmitted to be made by the service provider in accordance with the area which is relevant for the respective vehicle, this selection can also be carried out in the motor vehicle by means of an appropriate filter routine, directly after reception of the traffic information.

If a driver generally only drives within a specific area with his motor vehicle, for example as a taxi driver or a supplier, it is expedient if the selected area surrounds the position of the motor vehicle in an essentially circular shape. However, if a route is planned for a journey to a distant destination, for example on an overload route, it is expedient if the selected area can be defined with respect to the particular current position of the motor vehicle as a function of a planned route for a journey, surrounding it in a corridor-like fashion.

In order to prevent the traffic messages which are not relevant to the driver being announced or displayed to him, according to an advantageous development of the invention there is provision for each traffic message to be transmitted together with an item of updating information which describes the anticipated duration of the general relevance of the respective traffic information, for the average vehicle speed to be detected, logically linked to the distances assigned to the traffic messages and compared with the updating information in order to detect the specific relevance of the respective traffic message, and for only traffic messages which have already been assessed relevant to the respective vehicle in terms of timing to be output.

This makes it possible to prevent, for example, a report of traffic congestion being announced to the driver of a vehicle if said announcement relates to a route section of his planned route but is likely to be long out of date when he reaches this route section. If it is therefore, for example, possible to expect that congestion which is, for example, 200 km away on the planned route will have cleared, for example, in an hour the driver of a vehicle which is travelling 100 km/h on average does not need to have this congestion announced to him because the vehicle will not reach this section of the route until two hours later, that is to say when the traffic message no longer applies.

In this context, it is particularly expedient if the updating information of the respective traffic message contains the transmission time, the anticipated duration and the detection time of the reported event.

In one advantageous refinement of the invention there is provision for first the direction of travel of the motor vehicle to be detected, for the direction of the motor vehicle with respect to the particular position of the traffic message to be detected and to be compared with the direction of travel, and for the traffic messages to be output sorted according to directions. In this way it is possible to ensure that two or more traffic messages which relate to traffic events which are at equal distances from the current position of the motor vehicle can be output sorted once more according to their instantaneous direction-dependent relevance for the driver. A traffic event which occurs near to a putative route is not output in such a case until after the announcement or display of the traffic event which has occurred at a place directly in front of the vehicle.

Here, it is also possible to determine by means of the direction in which the position of the traffic message, that is to say the location of the traffic event which is to be reported lies viewed from the instantaneous position of the vehicle whether the traffic message relates to the respective road in the direction of travel or the carriageway or carriageways in the opposite direction in order to avoid traffic messages relating to the opposite direction being announced or displayed.

One advantageous refinement to the invention is characterized by the fact that a directional factor is formed for each traffic message from the direction of the motor vehicle with respect to the particular position of the traffic message and the direction of travel, which factor is combined with the distance assigned to the respective traffic message to form a local relevance factor which is taken into account during the outputting of the traffic messages, a traffic message being preferably output only if its local relevance factor is higher than a predefinable threshold value.

Another advantageous refinement of the invention is characterized in that the position of the motor vehicle is determined as a Geocode using a satellite-supported position-determining system, in particular with the GPS (Global Positioning System), and in that the positions of the traffic messages are also provided as Geocodes, with the result that the distances can be determined without further conversion calculations. By using Geocodes, it is possible to determine particularly easily both the distances between the vehicle and route sections affected by the traffic messages, the direction of travel and the directions of the vehicle with respect to the route distances.

BRIEF DESCRIPTION OF THE DRAWINGS

The invention is explained in more detail below, by way of example, with reference to the drawing, in which.

Components and method steps which correspond to one another are provided with the same reference symbols in the different figures of the drawing.

DETAILED DESCRIPTION OF THE PREFERED EMBODIMENT (S)

Figure 1:
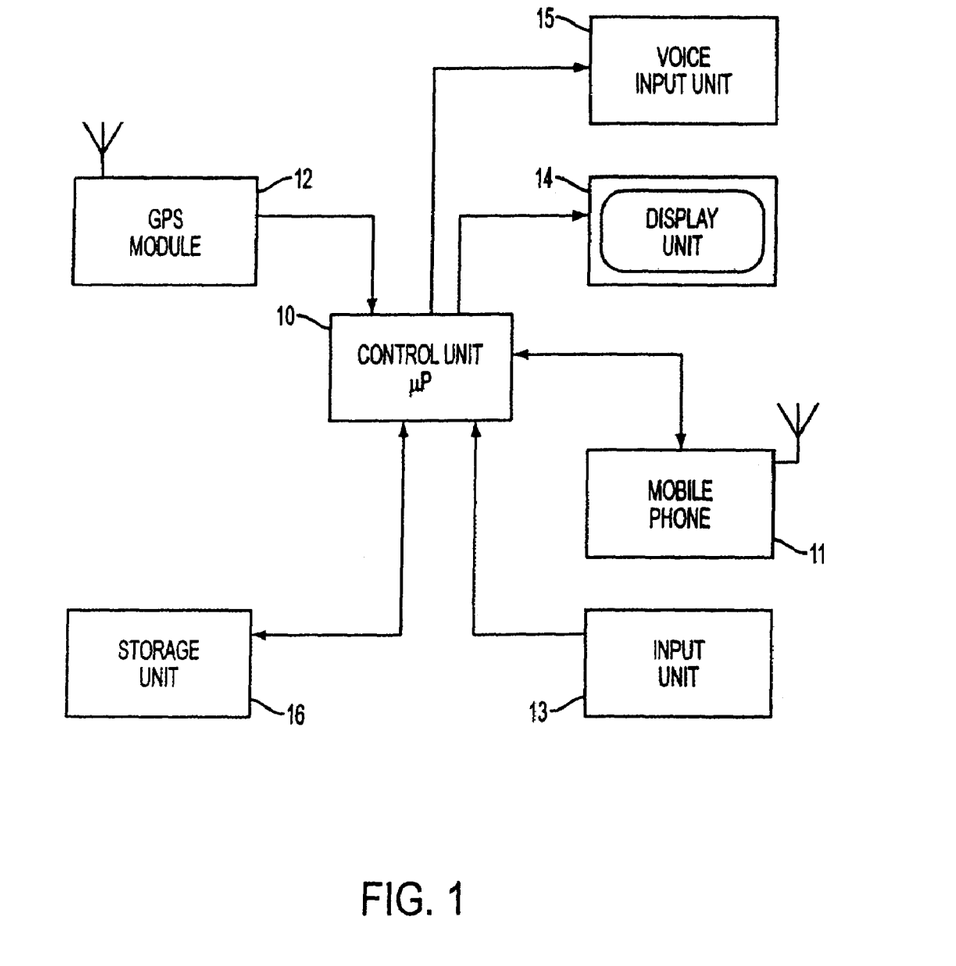
FIG. 1 shows a simplified, diagrammatic view of a user unit for use as a terminal in a traffic information system.

As is shown in FIG. 1, a user unit which can be used as a terminal in a traffic information service system has a central processing and control unit 10 which is embodied, for example, as a microprocessor μP and to which a mobile phone 11 is connected as telecommunication unit for communication with a control centre of a road or traffic information service system, and to which, for example, a GPS module 12 is connected as a position-finding module of a satellite-supported position-determining system. To operate the user unit, an input unit 13 is provided which may be, for example, a voice input unit, a complete alphanumeric keyboard, a keypad, such as is used also in telephones, in particular in mobile phones, or in the simplest case a lock-down rotary actuator. It is also possible, instead of a separate input unit 13, to use the keypad of the mobile phone 11 or a voice input unit which is provided in the mobile phone 11.

In order to display system acknowledgements while the user unit is being operated, and in particular while the communication with the control centre of the information service system is being prepared, and in order to display information which is transmitted by the information service system to the user unit and information which is stored there, a display unit 14 and/or a voice output unit 15 are expediently connected to the central processing and control unit 10. The display unit 14 may be a screen embodied, for example, as a liquid crystal display here.

A storage unit 16 is used for the temporary or permanent storage of traffic information and other data.

The method according to the invention is explained in more detail below, by way of example, with reference to the flowcharts illustrated in the drawing. When the user unit is operating, the user, that is to say in particular the driver of a motor vehicle is provided not only with a multiplicity of further operating functions (not illustrated in more detail) by means of a "traffic information" menu item but also has the possibility of requesting current traffic information and having it displayed and/or announced depending on the features of the terminal.

Depending on the way in which the traffic information service system is configured, the user has the possibility, by means of the user unit, of transmitting in a suitable dialogue a traffic information request together with the instantaneous motor vehicle position, which has been determined by the GPS module 12, to the service provider, that is to say to the control centre of the information service system. At the service-provider end, the traffic messages which are stored together with the respective position of the route section or route point, that is to say together with the location at which a traffic event which is to be reported is located, are sorted as a function of distance, in that the positions of the traffic messages are initially compared with the respective position of the motor vehicle, in order to determine the distances from them. As soon as the sorting process has been terminated, the traffic information with the traffic messages which are stored according to distances can then be transmitted by the service provider to the user unit and output there in a suitable way.

However, it is preferable if only the traffic messages together with the respective position of the route section to which they relate are transmitted by the control centre of the information service system in response to a traffic information request by a user.

Figure 2:
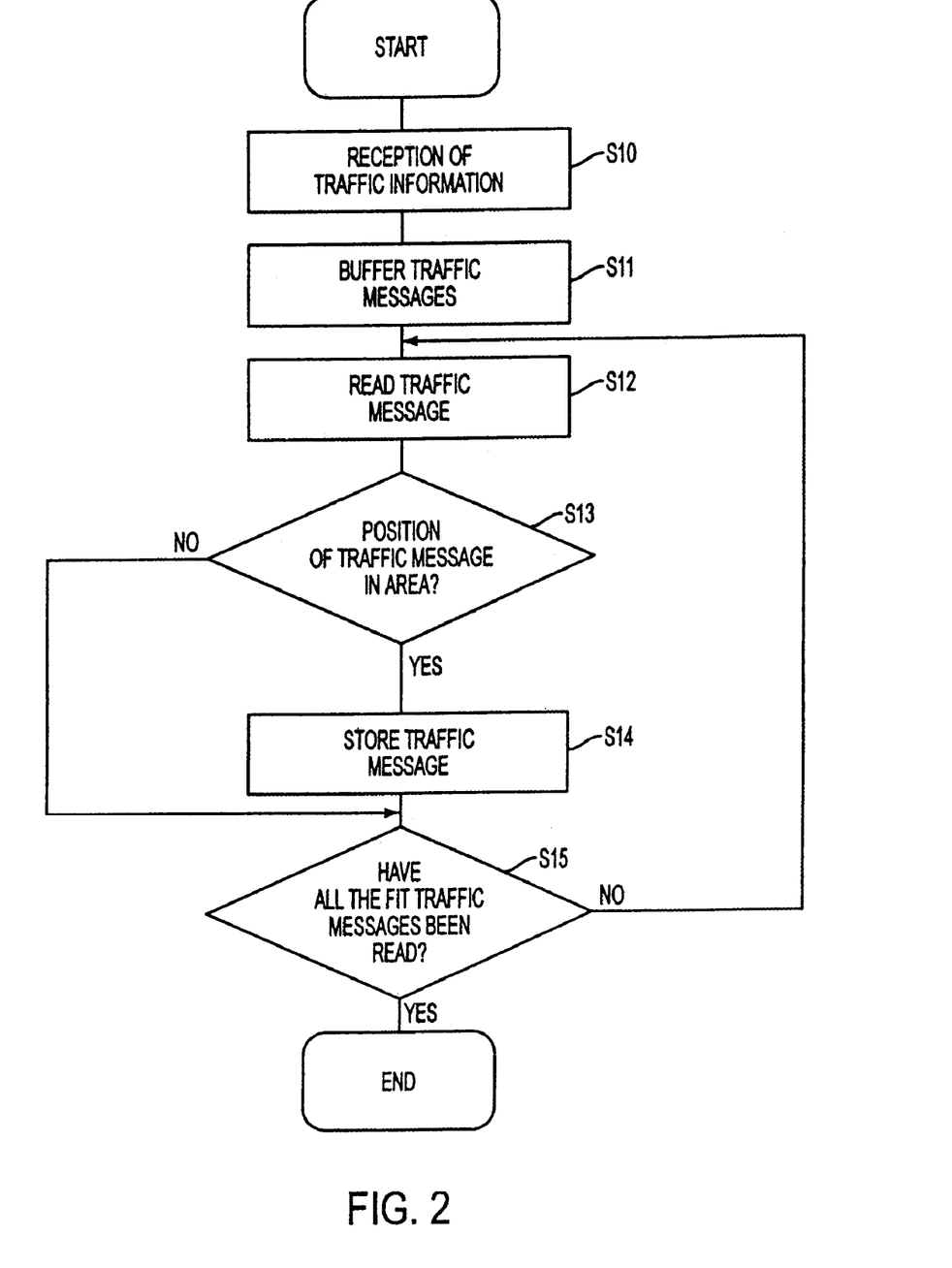
FIG. 2 shows a flowchart of a filter routine which is used in the method according to the invention.

In order to keep the number of traffic messages which are to be stored and output later as small as possible, after traffic information is received in step S10 and the traffic messages are buffered in step S11 a filter routine shown in FIG. 2 is initially used to read the traffic messages individually in step S12 in order to determine in step S13 whether or not the position of the traffic message, that is to say the position of the route section to which the traffic message relates, lies in an area which can be determined in advance by the user. If the relevant route section does not lie in the predetermined area, the routine returns to step S12 in order to read the next traffic message, after checking in step S15 whether all the buffered traffic messages have been read.

However, if the traffic message which is read in step S12 lies in the area, the traffic message is stored in step S14. In step S15, it is then checked whether all the traffic messages have been read. If this is the case, the filter routine is terminated. Otherwise, the routine continues reading traffic messages in step S12 until all the traffic messages have been read.

The area which is selected for the selection of the traffic messages which are of interest for the user is either an essentially circular area whose radius is expediently predefined by the system if the user does not input an appropriate value or it. For destination-oriented journeys, in particular for overland journeys, it is expedient if a keyhole-like area is defined which comprises an essentially circular section with a relatively small radius around the instantaneous position of the vehicle and a conical area lying in the direction of the destination on both sides of the presumed route.

If the user is also provided with a navigation system in his user unit and if there is route planning to the desired destination, the area of interest can also be selected in a corridor-like fashion along the route, in which case the width of the corridor can either be freely selected by the driver or can expediently be defined by the system.

Figure 3:
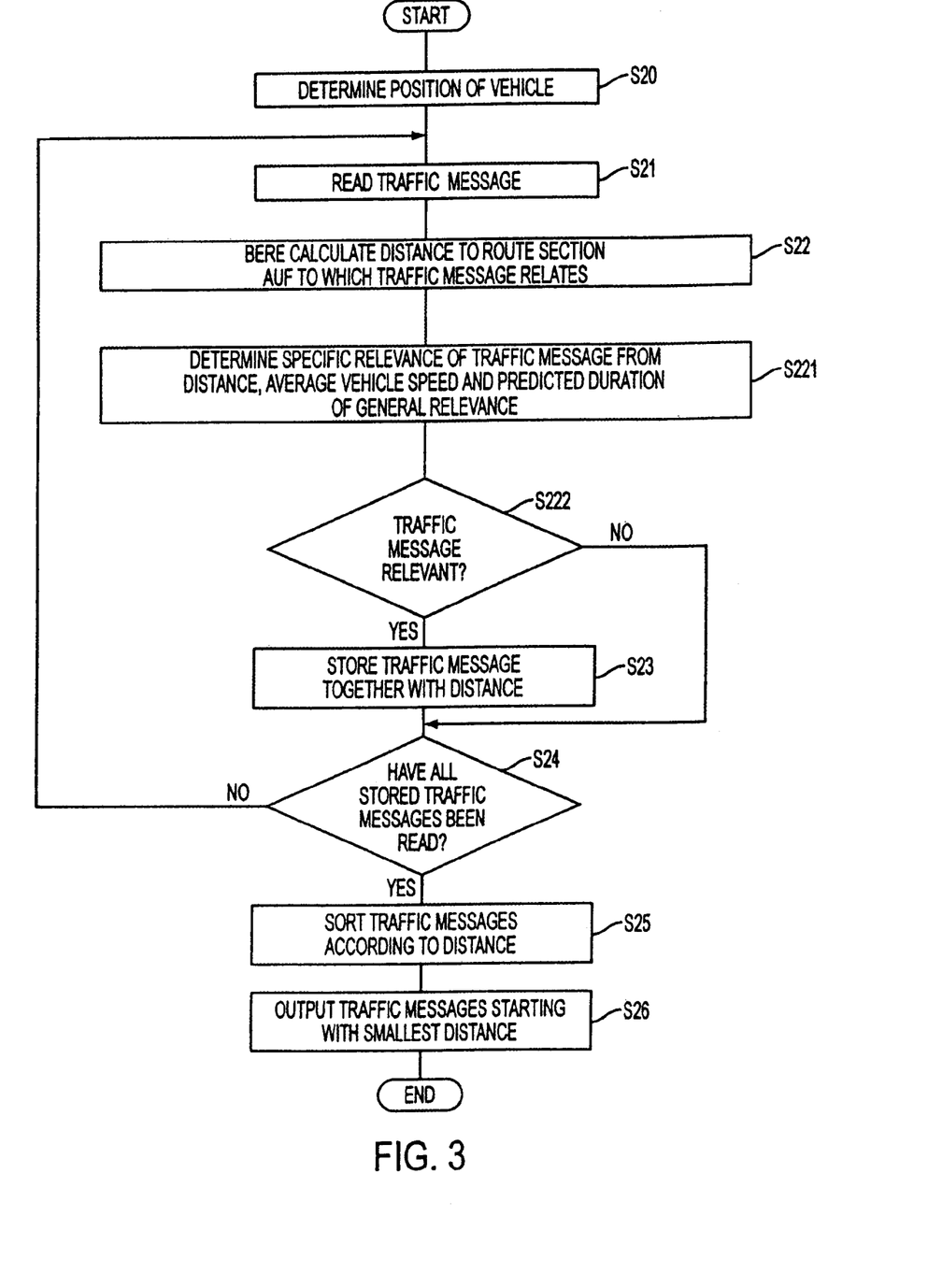
FIG. 3 shows a flowchart of a first exemplary embodiment of the method according to the invention.

As soon as all the traffic messages relating to the selected area have been stored using the filter routine, the individual traffic messages are output in accordance with the output routine illustrated in FIG. 3.

For this purpose, firstly the current position of the vehicle is determined in step S20 before the traffic messages are announced or displayed. As soon as a traffic message has subsequently been read in step S21, the distance between the position of the vehicle and the position of the route section which is affected by the traffic message is subsequently calculated in step S22. Then, in the simplest case, in step S23 the traffic message is stored together with the calculated distance. Then, in step S24 it is checked whether all the stored traffic message have been read, and the routine is continued in step S21 until the distance from the route section for each traffic message has been calculated. After the traffic messages have been sorted, in step S25, as a function of the distances assigned to them, in step S26 the traffic messages are then output starting with the smallest distance.

So that, in this process, the individual traffic events, for example congestion and obstructions, and route information, such as road closures, diversions and road conditions due to the weather, are announced or displayed to the driver not only in the order in which the user is confronted with them but also to present the user with only the traffic messages which are actually relevant to him, it is possible, in the routine illustrated in FIG. 3, for the specific relevance of the traffic message to be determined in step S221, after the distance calculation in step S22.

For this purpose, it is calculated, for example, from the distance determined in step S22 and an average vehicle speed, when the user will reach with his vehicle the route section which is affected by the traffic message. This time is compared with an item of updating information which is added to each traffic message and from which the predicted end of the traffic problem which is to be reported can be determined. This predicted end of the traffic problem can be specified relatively precisely, for example in the case of road closures or obstructions as a result of roadworks. In the case of obstructions as a result of traffic accidents, the end can often also be estimated by taking into account the time of the accident and the severity of the accident.

By comparing the time at which the user is predicted to reach, with his vehicle, the corresponding route section with the end time of the obstruction, it is possible to determine the specific relevance of the traffic message for the respective user. In step S222, it is then checked, using the specific relevance determined, whether or not the specific traffic message is relevant, and whether or not it should be stored, together with the distance, in step S23. In the latter case, the routine returns to step S21 in order to read the next traffic message after it has been checked in step S24 whether all the buffered traffic messages have already been read.

Figure 4:
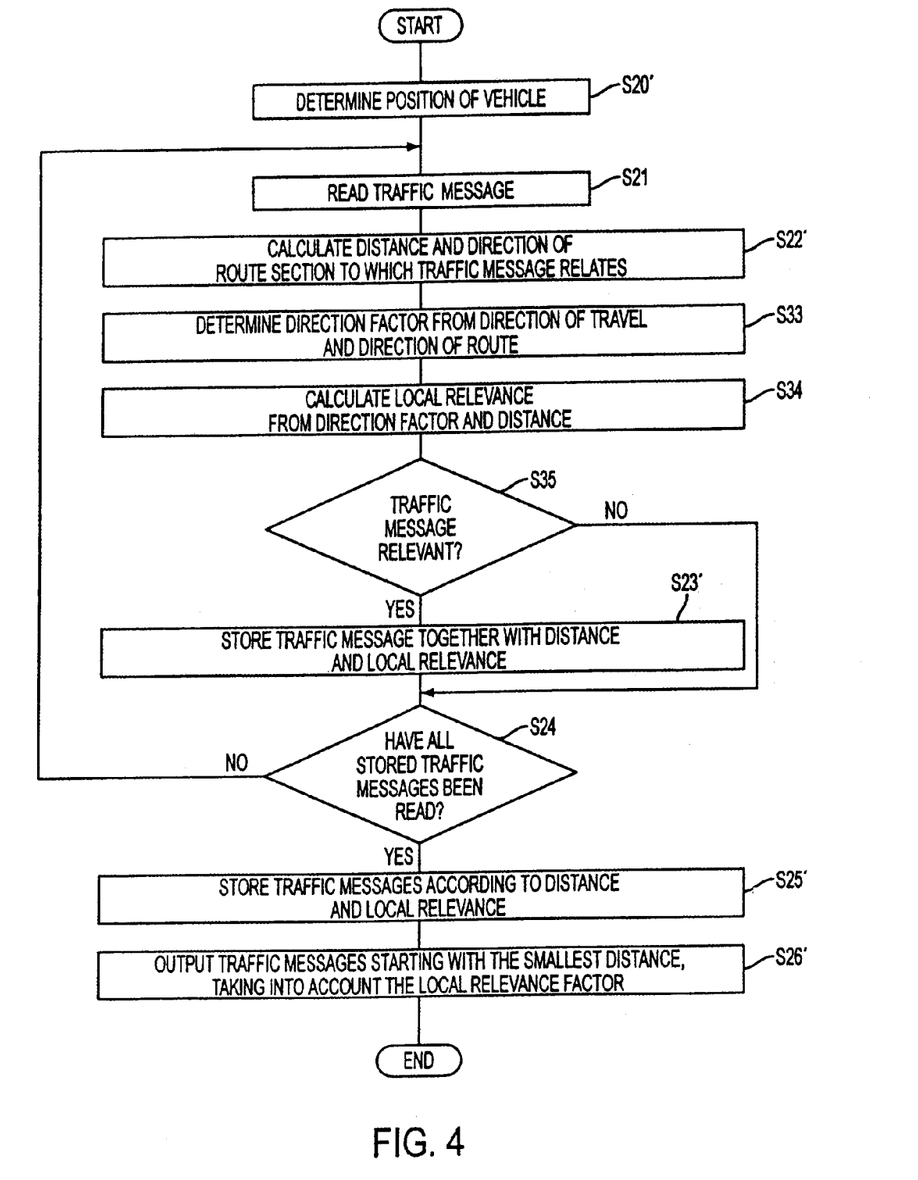
FIG. 4 shows a flowchart of another exemplary embodiment of the method according to the invention.

In another exemplary embodiment of the method according to the invention for outputting traffic information, firstly not only the vehicle position but also the direction of travel are firstly determined in step S20' as shown in FIG. 4, in that, for example, a direction of travel vector, referred for short below as direction of travel, is calculated from two or more successive vehicle positions. Subsequently, in step S21, the traffic message is respectively read in order to determine, in step S22', not only the distance between the route section and the current position of the vehicle but also the direction with respect to this route section. In step S33, a direction factor is then determined from the direction of travel and the direction of the route section in order to calculate a local relevance, in step S34, from the distance and the direction factor of each traffic message. Here, it is expediently also taken into account whether the traffic event on which the traffic message is based is significant for the current direction of travel or for the opposite direction of travel.

If, for example, a traffic event is located at a route section which lies ahead in the direction of travel, the angle between the direction of travel and the direction of the route section is 0° and the traffic message is given the local relevance 1 if it does not relate to the opposite direction. If a traffic event is located on a route section which lies to the side of the direction of travel, the angle between the direction of travel and the direction of route section differs from 0 and the local relevance is calculated from the direction factor and the distance. If the angle is relatively small, for example 5° or 10°, the traffic message is assigned a relatively high relevance, which is however less than 1. Here, given the same direction factor, the traffic event which lies further away is, for example, given the higher relevance because the probability of a deviation from the instantaneous direction of travel increases as the distance between the position of the traffic message and the instantaneous position of the vehicle increases. If the route section is virtually at a right angle to the direction of travel, or is even located behind the current position of the vehicle, in the case of a destination-oriented journey the respective traffic message is designated as being irrelevant.

The local relevance, which may, for example, be a value between 0 and 1 or even, in binary representation, an integer between 0 and 3 or 0 and 7, depending on the number of bits used, is then assigned to the traffic message so that in step S35 it is possible to check whether the traffic message is relevant, that is to say whether or not the local relevance exceeds a predefined threshold of value. If the traffic message is considered to be relevant, it is subsequently stored in step S23' together with the distance and the local relevance. The threshold value for the local relevance can either be defined by the user himself or expediently by the system. If the user is, for example, driving in a town where he frequently changes his direction of travel, the threshold value for the local relevance can be set, for example, to 0 in order to output all the traffic messages independently of the direction, but sorted according to distance and preferably also according to local relevance. If the user is on a destination-oriented journey with his vehicle, he can enter a relatively high threshold value so that traffic events occurring near to his intended route are suppressed, like putting blinkers on the system.

If a traffic message is considered as not being relevant in step S35, the routine returns directly to step S21 in order to read the next traffic message, after it has been checked in step S24 whether all the buffered traffic messages have already been read.

In step S24, it is then checked whether: all the traffic messages have been read, so that they are then sorted according to distance in step S25'. In step S26', the traffic messages are then output starting with the smallest distance, taking into account the local relevance factor.

Here, for example, all the traffic messages of a distance range are announced or displayed depending on their relevance. It is also possible that first only the traffic messages with the respective highest relevance are output sorted according to distances, so that the traffic messages with lower relevance are then also displayed or announced sorted according to distance.

Furthermore, it is finally possible that, in addition to the determination of the local relevance in steps S33, S34 and S35, the chronological relevance, as has been determined and checked in steps S221 and S222, is taken into account before and after the local relevance is defined, so that the user of the traffic information system is intentionally presented only with the traffic messages which are important to him in order to support him in selecting his route in an optimum way, without distracting him unnecessarily from the events on the road, as do, for example, traffic announcements by radio transmitters.

The invention claimed is:

1. A method for outputting traffic information in a motor vehicle, comprising:
   receiving and thereafter buffering traffic messages together with the respective position of the route section or point to which the traffic message relates;
   determining whether or not the position of the route section to which the traffic message relates lies in a selected area;
   storing only those traffic messages that relate to the selected area together with the respective position of the route section or to a point to which the traffic message relates;
   comparing positions of the traffic messages with a respective position of the motor vehicle in which the traffic information is to be output in order to determine distances between the respective positions in the traffic messages and the position of the motor vehicle;
   sorting the traffic messages in accordance with distances determined;
   outputting the traffic messages starting with the smallest distance;
   detecting whether the traffic message is significant for a current direction of travel or for an opposite direction of travel; and
   outputting only traffic messages that are relevant to the current direction of travel.

2. The method according to claim 1, further comprising transmitting the sorted traffic messages to a motor vehicle.

3. The method according to claim 1, further comprising transmitting the traffic messages to a motor vehicle, sorting the transmitted messages and storing the sorted transmitted messages.

4. The method according to claim 1, further comprising continuously updating the transmitted traffic messages and transmitting the updated traffic messages to the motor vehicle at predefined time intervals.

5. The method according to claim 1, further comprising a user defining an area of traffic messages surrounding the position of the motor vehicle, the area comprising an essentially circular shape surrounding the position of the motor vehicle.

6. The method according to claim 1, further comprising a user defining a selected area of traffic messages surrounding the position of the motor vehicle as a function of a planned route for a journey, the area comprising an essentially corridor-like shape surrounding the position of the motor vehicle.

7. The method according to claim 1, further comprising:
   detecting first the direction of travel of the motor vehicle;
   detecting the direction of the motor vehicle with respect to the particular position of the traffic message and comparing the detected position of the motor vehicle with the direction of travel;

comparing the direction of the motor vehicle with respect to the particular position of the traffic message with the direction of travel; and outputting traffic messages that are sorted according to directions.

8. The method according to claim 1, further comprising:

forming a directional factor for each traffic message from the direction of the motor vehicle with respect to the particular position of the traffic message and the direction of travel; and combining the directional factor with the distance assigned to the respective traffic message to form a local relevance factor which is taken into account during the outputting of the traffic messages.

9. The method according to claim 1, further comprising outputting a traffic message only if its local relevance factor is higher than a predefinable threshold value.

10. The method according to claim 1, further comprising:

detecting the position of the motor vehicle as a Geocode using a satellite-supported position-determining system, in particular with the GPS (Global Positioning System); and providing the positions of the traffic messages as Geocodes, and determining the distances without further conversion calculations.

11. The method according to claim 1 further comprising automatically determining the selected area as a substantially circular area with a radius that is expediently predefined by the system.

12. The method according to claim 1 further comprising automatically defining the selected area, for the selection of messages that are of interest for the user, as a substantially circular area with a relatively small radius around an instantaneous position of the vehicle.

13. The method according to claim 1 further comprising defining a substantially conical area lying in a direction of the destination on both sides of a presumed route.

14. The method according to claim 12 further comprising defining a substantially conical area lying in a direction of the destination on both sides of a presumed route.

* * * * *